US010654656B2

(12) United States Patent
Mäder (10) Patent No.: US 10,654,656 B2
(45) Date of Patent: May 19, 2020

(54) MEASURING DEVICE FOR ACQUIRING MEASUREMENT VALUES FOR MEASURING A TENSION IN A CONVEYING SYSTEM, AS WELL AS A CONVEYING UNIT AND A CONVEYING FACILITY

(71) Applicant: Ferag AG, Hinwil (CH)

(72) Inventor: Carl Conrad Mäder, Hittnau (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 16/255,010

(22) Filed: Jan. 23, 2019

(65) Prior Publication Data

US 2019/0233219 A1    Aug. 1, 2019

(30) Foreign Application Priority Data

Jan. 26, 2018    (CH) .................................... 0096/18

(51) Int. Cl.
| | |
|---|---|
| *B65G 43/00* | (2006.01) |
| *G01L 5/04* | (2006.01) |
| *B65G 17/06* | (2006.01) |
| *G01L 5/107* | (2020.01) |
| *B65G 43/06* | (2006.01) |
| *B65G 43/02* | (2006.01) |

(52) U.S. Cl.
CPC .......... *B65G 43/00* (2013.01); *B65G 17/065* (2013.01); *G01L 5/04* (2013.01); *G01L 5/107* (2013.01); *B65G 43/02* (2013.01)

(58) Field of Classification Search
CPC .......... B65G 43/00; B65G 43/06; G01L 5/04; G01L 5/107
USPC ...................... 198/810.01, 810.04
See application file for complete search history.

(56) References Cited

U.S. PATENT DOCUMENTS 4,564,099 A * 1/1986 Uozumi ................ B66B 29/005
                                                     198/323
5,251,492 A * 10/1993 Nowag .................... G01L 5/04
                                                     73/862.391

(Continued)

FOREIGN PATENT DOCUMENTS

DE    10 2015 007 995    12/2015
EP        1 690 811        8/2006
(Continued)

OTHER PUBLICATIONS

Switzerland Search Report dated Apr. 12, 2018, Application No. CH00096/18, 2 pages.

*Primary Examiner* — Douglas A Hess
(74) *Attorney, Agent, or Firm* — Rankin, Hill & Clark LLP (57) ABSTRACT

A measuring device serves for acquiring measurement values for measuring a tension in a conveying system. The measuring device is designed to guide a conveying member from a first section of the measuring device to a second section of the measuring device, to effect a deflection of the conveying member with regard to a straight-lined connection between the first and the second section and to detect measurement values corresponding to a reaction force according to this deflection. The measuring device includes surfaces for guiding rollers of the conveying member. One of these surfaces is a deflecting surface for deflecting the conveying member. The deflecting surface is formed on a deflecting element of a measuring element, and the reaction force is a force which acts upon the measuring element.

10 Claims, 8 Drawing Sheets

(56) References Cited

U.S. PATENT DOCUMENTS

| | | | | |
|---|---|---|---|---|
| 6,029,798 | A * | 2/2000 | Miller | B65G 43/02 |
| | | | | 198/502.1 |
| 6,088,559 | A * | 7/2000 | Costanza | G03G 15/754 |
| | | | | 198/810.04 |
| 6,834,228 | B2 * | 12/2004 | Serkh | F02B 67/06 |
| | | | | 123/195 A |
| 7,117,989 | B2 * | 10/2006 | Weigel | B65G 23/44 |
| | | | | 198/810.04 |
| 7,140,486 | B2 * | 11/2006 | Kim | F16H 7/08 |
| | | | | 198/810.03 |
| 8,191,703 | B2 * | 6/2012 | Tokhtuev | B65G 43/02 |
| | | | | 198/810.04 |
| 8,285,494 | B2 * | 10/2012 | Vozner | G01B 11/028 |
| | | | | 198/502.1 |
| 8,550,236 | B2 * | 10/2013 | Merten | B65G 23/44 |
| | | | | 198/502.1 |
| 9,809,389 | B2 * | 11/2017 | Pauli | G01L 1/04 |
| 10,179,704 | B1 * | 1/2019 | Wu | B65G 43/02 |
| 10,189,649 | B2 * | 1/2019 | Kuesel | B65G 15/64 |
| 2004/0072524 | A1 | 4/2004 | Van Den Dungen et al. | |
| 2005/0187053 | A1 | 8/2005 | Kim | |

FOREIGN PATENT DOCUMENTS

| | | |
|---|---|---|
| EP | 3 006 381 | 4/2016 |
| GB | 2 334 938 | 9/1999 |
| WO | 2014/166004 | 10/2014 |
| WO | 2017/088077 | 6/2017 |

* cited by examiner

MEASURING DEVICE FOR ACQUIRING MEASUREMENT VALUES FOR MEASURING A TENSION IN A CONVEYING SYSTEM, AS WELL AS A CONVEYING UNIT AND A CONVEYING FACILITY

BACKGROUND OF THE INVENTION

Field of the Invention

The invention generally relates to the field of conveying technology and, more particularly, to a measuring device for acquiring measurement values for measuring a tension in a conveying system, to a conveying unit and to a conveying facility.

Description of Related Art

Long conveying units, even over kilometres, for example as part of sorting conveyers, can be present in logistics facilities. They can be subjected to changing loads and be led upwards and downwards. Several drives can be arranged along a conveying unit for the drive of accordingly long conveying members, for example with concatenated (or interlinked) conveying links. The drive forces that are exerted upon the conveying member by these drives must be coordinated with one another, so that on the one hand the conveying member is moved at the necessary conveying speed and on the other hand locally high loading does not occur, such loading in the extreme case being capable of destroying the conveying member or at least being able to lead to an excessive loading and wearing of the conveying member.

A method that is for the closed-loop control of drives of conveying sections of a conveying system and meets these needs is described in WO 2014/166004 A1. The method can use a measurement of the loading of the conveying system as a basis for the closed-loop control.

Methods, in which a sensor is designed as part of the conveying member and is co-moved with the conveying member, are known. Sensor data is transmitted to a control in a wireless manner. However, with this it is not possible to obtain a continuous measurement of the tension of the conveying member at a certain location of the conveying track.

SUMMARY OF THE INVENTION

It is the object of the invention to provide a measuring device for acquiring measurement values for measuring a tension in a conveying system, the measuring device permitting an improved measurement, as well as to provide a corresponding conveying unit and a conveying facility.

A measuring device serves for acquiring measurement values for measuring a tension in a conveying system. For this, the measuring device is designed to guide a conveying member from a first section of the measuring device to a second section of the measuring device, to effect a deflection of the conveying member with regard to a straight-lined connection between the first and the second section and to acquire measurement values corresponding to a reaction force according to this deflection.

Herein, the measuring device includes surfaces to guide rollers of the conveying member. One of these surfaces is a deflecting surface for deflecting the conveying member. The deflecting surface is formed on a deflecting element of a measuring element and the reaction force is a force that acts upon the measuring element.

The tension can be determined from the mentioned measurement value that corresponds to the reaction force. The tension also corresponds to a tensile force that acts between elements of the conveying member.

The tension, which is determined in such a manner, is hereinafter designated as the measured tension. The tension of the conveying member can be closed-loop controlled with the measured tension, so that it is compensated over the complete length of the conveying member. In particular, it can be closed-loop controlled such that as a whole an as small as possible force is exerted upon the conveying member by way of one or more drives that engage on the conveying member—just enough force to keep it in motion. The mechanical loading of the conveying member is minimised by this, which in turn reduces its wear and increases the service life. Furthermore, the drive energy is kept small and is at least approximately minimised.

The measuring device can be applied with conveyors with conveying members of concatenated (or interlinked) conveying links. Such, for example, are plate conveyors, gripper conveyors, tray conveyors, modular belt conveyors, pocket conveyors, suspended conveyors.

In embodiments, the measuring device includes a guide channel for guiding the conveying member.

The measuring device is thus designed to guide the conveying member and to hold it in a defined, in particular unvarying position relative to the measuring element. This is in contrast to an arrangement in which, for example, a conveying member bears on a measuring element but, however, remains movable in a direction transverse to the movement direction of the conveying member. The movement direction can also be called conveying direction.

In embodiments, the guide channel includes surfaces for guiding the conveying member in the horizontal direction. By way of this, in the horizontal direction a defined and unvarying position of the conveying member relative to the measuring element can be achieved, In embodiments, the guide channel includes surfaces for guiding the conveying member in the vertical direction.

By way of this, in the vertical direction a defined and unvarying position of the conveying member relative to the measuring element can be achieved, In embodiments, a vertical and horizontal guidance are present.

In embodiments, the measuring device is designed to effect the deflection of the conveying member in the horizontal direction. Herein, the reaction force—compared to a deflection in the vertical direction—is essentially independent of the weight of the conveying member and of conveyed objects.

In embodiments, the measuring device is designed to effect the deflection of the conveying member in the vertical direction. Herein, the reaction force is dependent on the weight of the conveying member and of the conveyed objects.

In embodiments, the measuring device is formed for the positive guidance of the conveying member.

With a positive guidance in the horizontal direction, for example, between a beginning and an end of the measuring section, there runs a section of the conveying track in which section the conveying member is guided from both sides with respect to a movement in a horizontal direction.

With a positive guidance in the vertical direction, for example, between a beginning and an end of the measuring section, there runs a section of the conveying track in which section the conveying member is guided from above and below with respect to a movement in the vertical direction.

In embodiments, the measuring device includes one or more measuring transducers for determining the measurement values, and the one or more measuring transducers are arranged for the contact-free measurement of a position of the measuring element with respect to a reference element.

Such contact-free measuring transducers are low in maintenance, robust and insensitive to contamination. They have a high durability with regard to long-term alternating loads.

A conveying unit includes a conveying track with a conveying member that is led therein, and at least one measuring device for measuring a tension in the conveying member.

A conveying track, in which the measuring device is applied and is used for the closed-loop control of one or more drives, can include ascending and descending conveying sections. In the ascending conveying sections, the conveying member is driven by the drives, in the descending ones by gravity. The drives can pull and/or push the conveying member through the conveying track.

In embodiments, the conveying track includes a straight section and the measuring device is arranged in a measuring section in this straight section, wherein the deflection deflects the conveying member out of an otherwise straight path.

In embodiments, the conveying member includes conveying links that are concatenated (or interlinked) with one another, and a conveying link includes rollers for the support and guidance of the conveying links in the conveying track.

In embodiments, rollers that roll on the deflecting element of the measuring element are guide rollers which effect a lateral guidance of the conveying links in a conveying track.

A deflection of the conveying member or of the conveying links by way of the guide rollers is effected in a horizontal direction.

In embodiments, rollers that roll on the deflecting element of the measuring element are run rollers that effect a supporting guidance of the conveying links in a conveying track.

A deflection of the conveying member or of the conveying links by way of the run rollers is effected in a vertical direction, thus upwards or downwards.

In embodiments, at least two conveying links bear with their rollers on the measuring element at every point in time on operation of the measuring device.

In other embodiments, precisely three or precisely four conveying links bear with their rollers on the measuring element.

In embodiments, the conveying links in each case are elements of a plate conveyor or of a gripper conveyor or of a tray conveyor or of a modular belt conveyor or of a pocket conveyor or of a suspended conveyor.

A conveying facility includes at least: a conveying unit with a conveying member, at least one measuring device for measuring a tension in the conveying member, at least one drive, and a controller that is designed to closed-loop control the at least one drive in accordance with measurement values of the at least one measuring device.

BRIEF DESCRIPTION OF THE DRAWINGS

The subject-matter of the invention is hereinafter explained by way of preferred embodiment examples which are represented in the accompanying drawings. In each case in a schematic manner are shown in.

DETAILED DESCRIPTION OF THE INVENTION

Basically, the same parts are provided with the same reference numerals in the figures.

Figure 1:
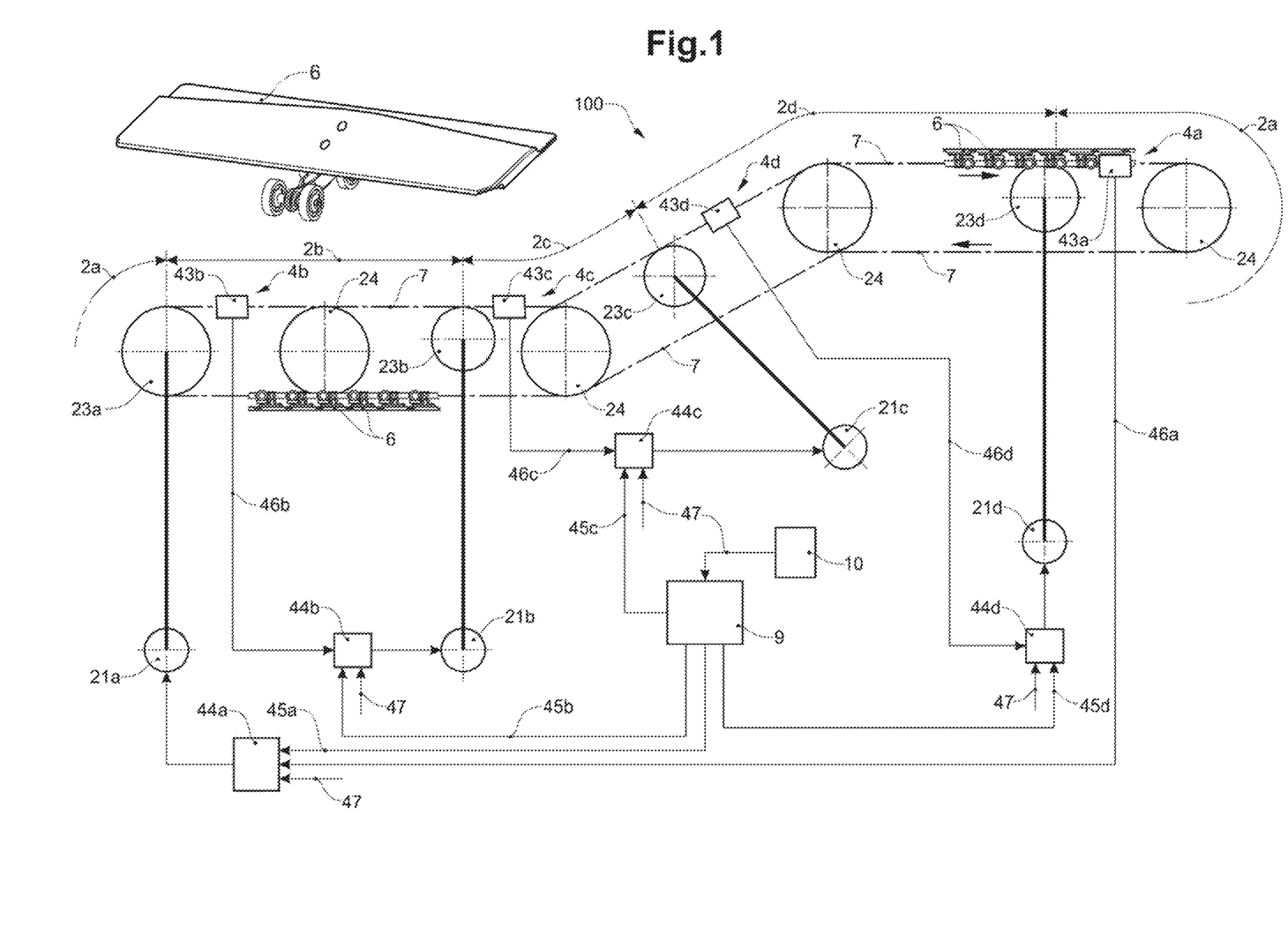
FIG. 1 a conveying system with several drives and conveying sections which lie therebetween.

FIG. 1 shows a conveying system 100 with a circulating conveying member 7, which is driven by several drives 21a, 21b, 21c, 21d, by which means conveying sections 2a, 2b, 2c, 2d, which lie between the drives, are defined. The conveying member 7 is a circulating conveying member with, for example, plate elements as conveying links 6, which are concatenated or interlinked to one another, or are pulled by way of a pulling means. The conveying member 7, guided by way of co-running, non-driven rollers 24, some of which are also deflecting rollers, runs in a guided manner around its circulating path (whose course is represented schematically by dot-dashed lines). Devices for force introduction 23a, 23b, 23c, 23d, which drive the conveying member, are arranged at several locations of the circulating track. These, for example, are cogs or cam wheels. These act, for example, in a deflecting drive or in a towing drive. These force introduction devices 23a, 23b, 23c, 23d are each driven by drives 21a, 21b, 21c, 21d. The drives 21a, 21b, 21c, 21d are, for example, electric motors, in particular asynchronous motors. The circulating track of the conveying member 7 is subdivided into several conveying sections 2a, 2b, 2c, 2d by way of the arrangement of the force introduction devices 23a, 23b, 23c, 23d, wherein a return run 2a can also be considered as a conveying section. A drive 21a, 21b, 21c, 21 can be assigned to each conveying section 2a, 2b, 2c, 2d. The respectively assigned drive 21a, 21b, 21c, 21d drives the conveying member in this conveying section 2a, 2b, 2c, 2d via an assigned force introduction device 23a, 23b, 23c, 23d. In regions in which the conveying member 7 is pulled by the drives, a conveying section 2a, 2b, 2c, 2d, beginning in each case from an assigned force introduction device 23a, 23b, 23c, 23d, extends counter to the conveying direction up to a coupling region 4a, 4b, 4c, 4d, which lies directly subsequent to the preceding force introduction device 23a, 23b, 23c, 23d. In regions in which the conveying member 7 is pushed or thrust by the drives (not represented in FIG. 2), a conveying section, in each case starting from an assigned force introduction device, extends in the direction of the conveying direction up to a coupling region which lies directly before the subsequent force introduction device. The coupling region 4a, 4b, 4c, 4d is therefore the region in which a conveying section 2a, 2b, 2c, 2d is adjacent to the subsequent or preceding conveying section 2a, 2b, 2c, 2d. The drive is assigned to both conveying sections in regions where a drive pulls in a first conveying section and pushes or thrusts in a subsequent conveying section.

A measuring device 43a, 43b, 43c, 43d is arranged for the closed-loop control of a drive of a conveying section 2a, 2b, 2c, 2d in each case. This measures a loading of the conveying system
- in sections in which the conveying member 7 is pulled, in the coupling region 4a, 4b, 4c, 4d at the beginning of the conveying section 2a, 2b, 2c, 2d, between the conveying section 2a, 2b, 2c, 2d and the preceding conveying section; or,
- in sections in which the conveying member 7 is pushed, in the coupling region at the end of the conveying section, between the conveying section and the subsequent conveying section.

The measuring device 43a, 43b, 43c, 43d produces a measuring signal 46a, 46b, 46c, 46d that corresponds to a loading of the conveying system in the coupling region 4a, 4b, 4c, 4d, for example to a tension or compression, these acting for the driving of the conveying member 7. The measurement itself can be effected by way of measuring a force for deflecting the conveying member 7, as described further below, or by way of sensors that circulate with the conveying member 7 and detect the tension or compression in the conveying member, and whose measurement values in a coupling region 4a, 4b, 4c, 4d can each be read out and form the measuring signal 46a, 46b, 46c, 46d by way of this.

A closed-loop control device 44a, 44b, 44c, 44d, which is assigned to a conveying section 2a, 2b, 2c, 2d, in each case processes the measuring signal 46a, 46b, 46c, 46d, which is assigned to the conveying section 2a, 2b, 2c, 2d, and closed-loop controls the assigned drive 21a, 21b, 21c, 21d.

The closed-loop control device 44a, 44b, 44c, 44d can process a common setpoint as a pilot (feed-forward) control signal 47. The common setpoint can be the same for all closed-loop control devices 44a, 44b, 44c, 44d of the conveying system. The common setpoint can be set by a superordinate control 10. The common setpoint can be a setpoint for a cycle, a frequency or a speed of the conveying system as a whole.

The closed-loop control device 44a, 44b, 44c, 44d can process a loading setpoint for the respective loading, hereinafter simply called setpoint 45a, 45b, 45c, 45d. This setpoint 45a, 45b, 45c, 45d can be defined and changed by a controller 9 of the conveying system. However, the setpoint 45a, 45b, 45c, 45d can also be stored in the closed-loop control device 44a, 44b, 44c, 44d as a constant setting, or it can be variable in time and be modified, for example by the closed-loop control device 44a, 44b, 44c, 44d in accordance with another setting, for example the feed-forward control signal 47.

The manner of functioning of the closed-loop control device 44 can be as is described in the publication WO 2014/166004 A1.

Figure 2:
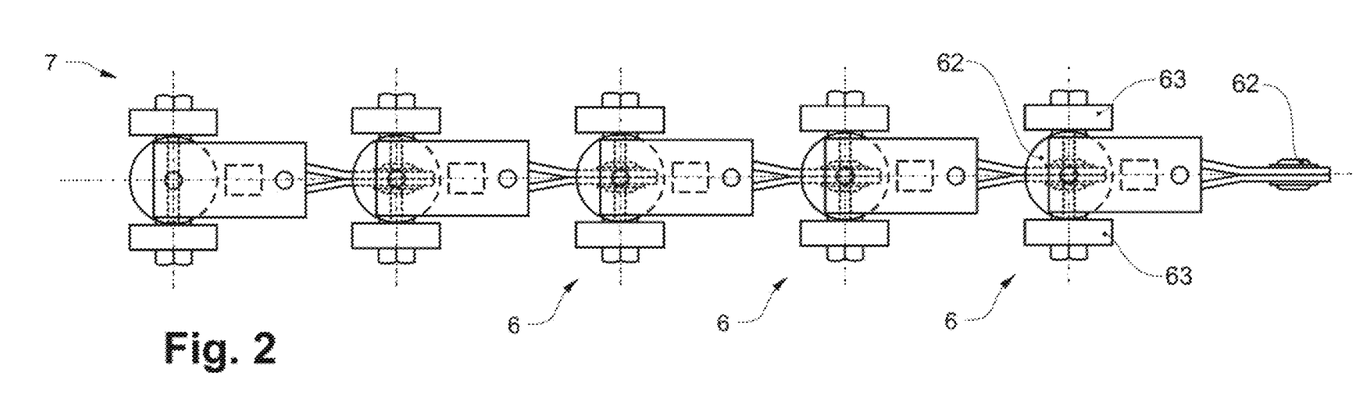
FIG. 2 a conveying member with conveying links.
Figure 6:
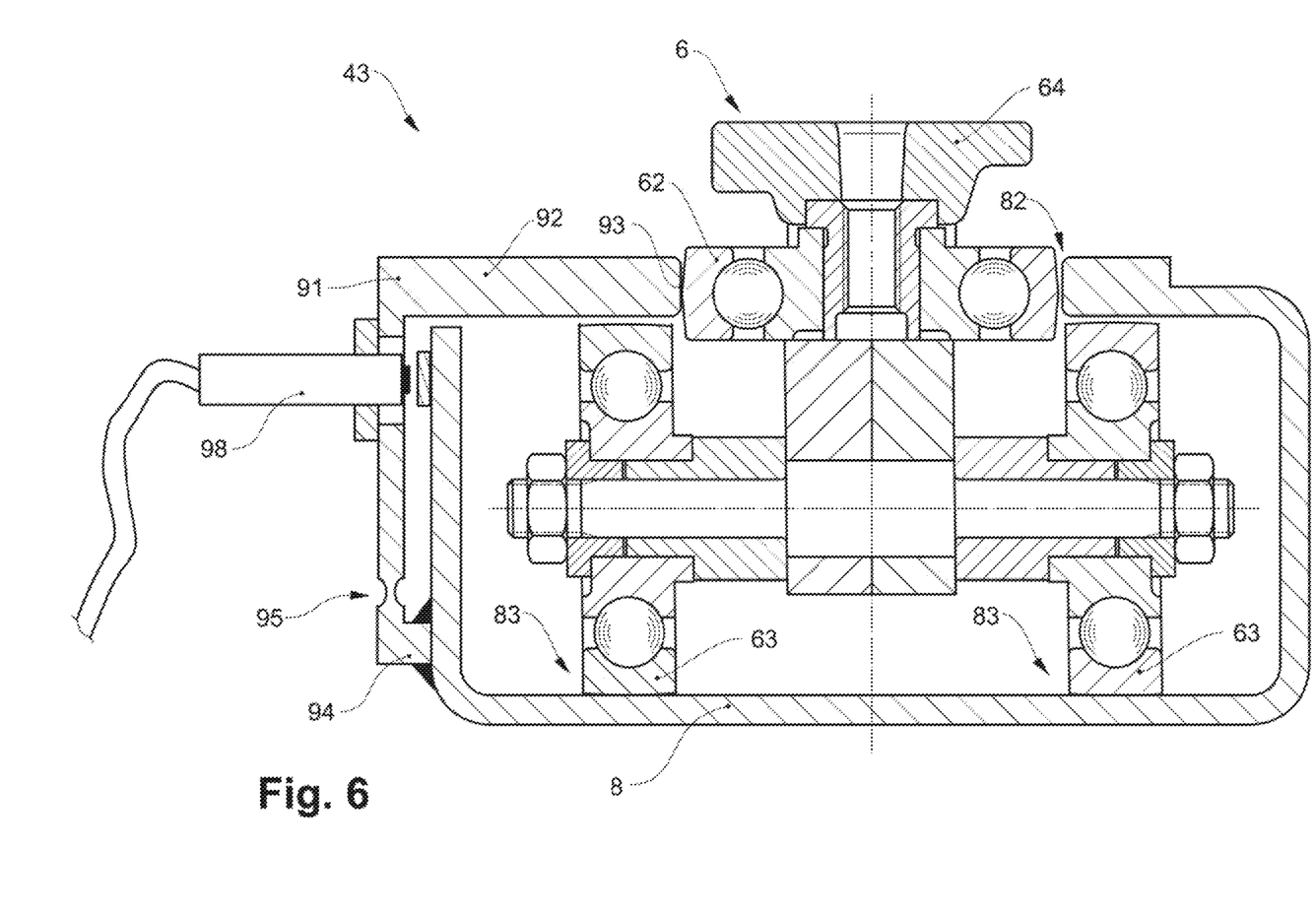
FIG. 6-8 embodiments of measuring devices in cross section.
Figure 7:
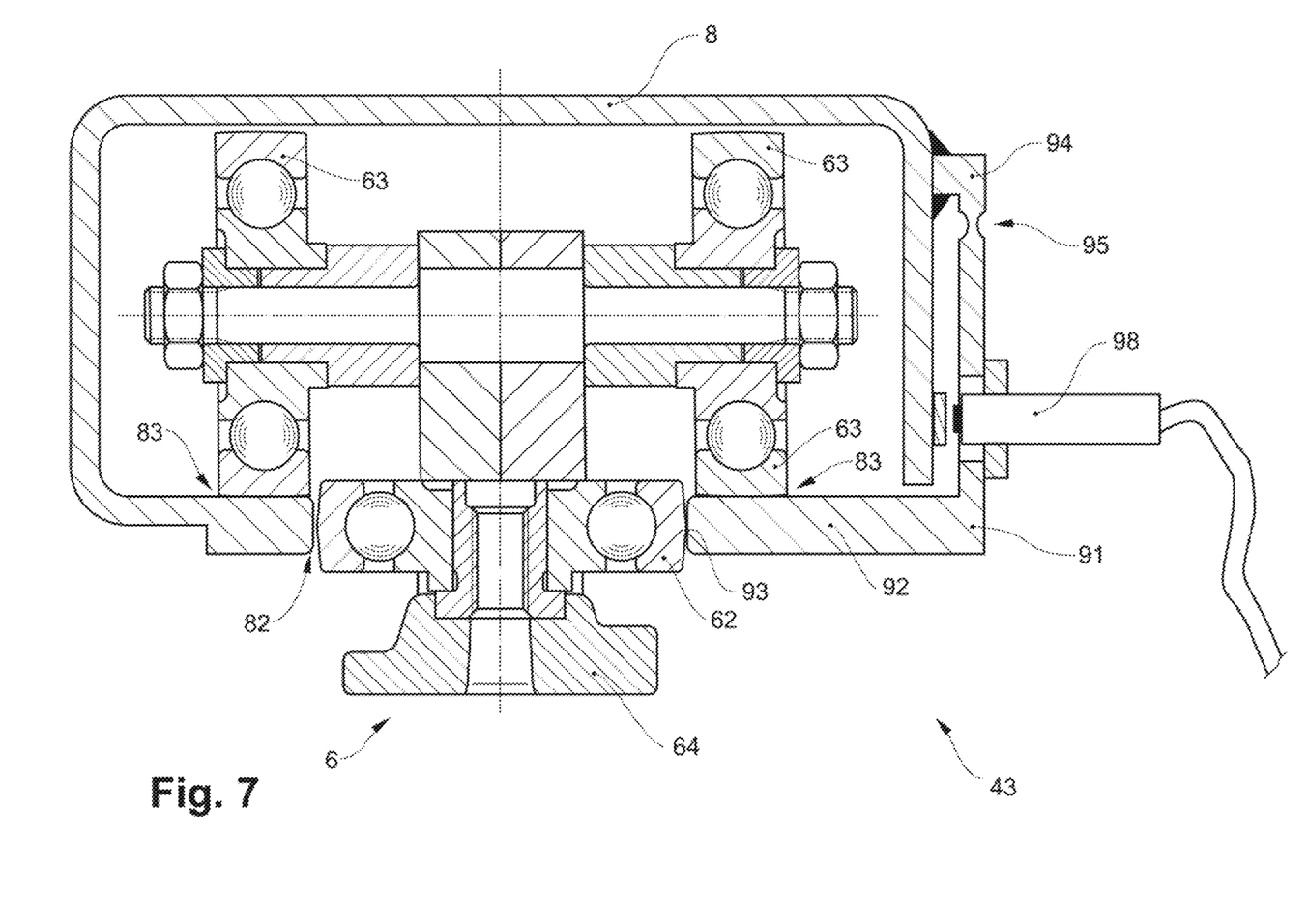
Figure 8:
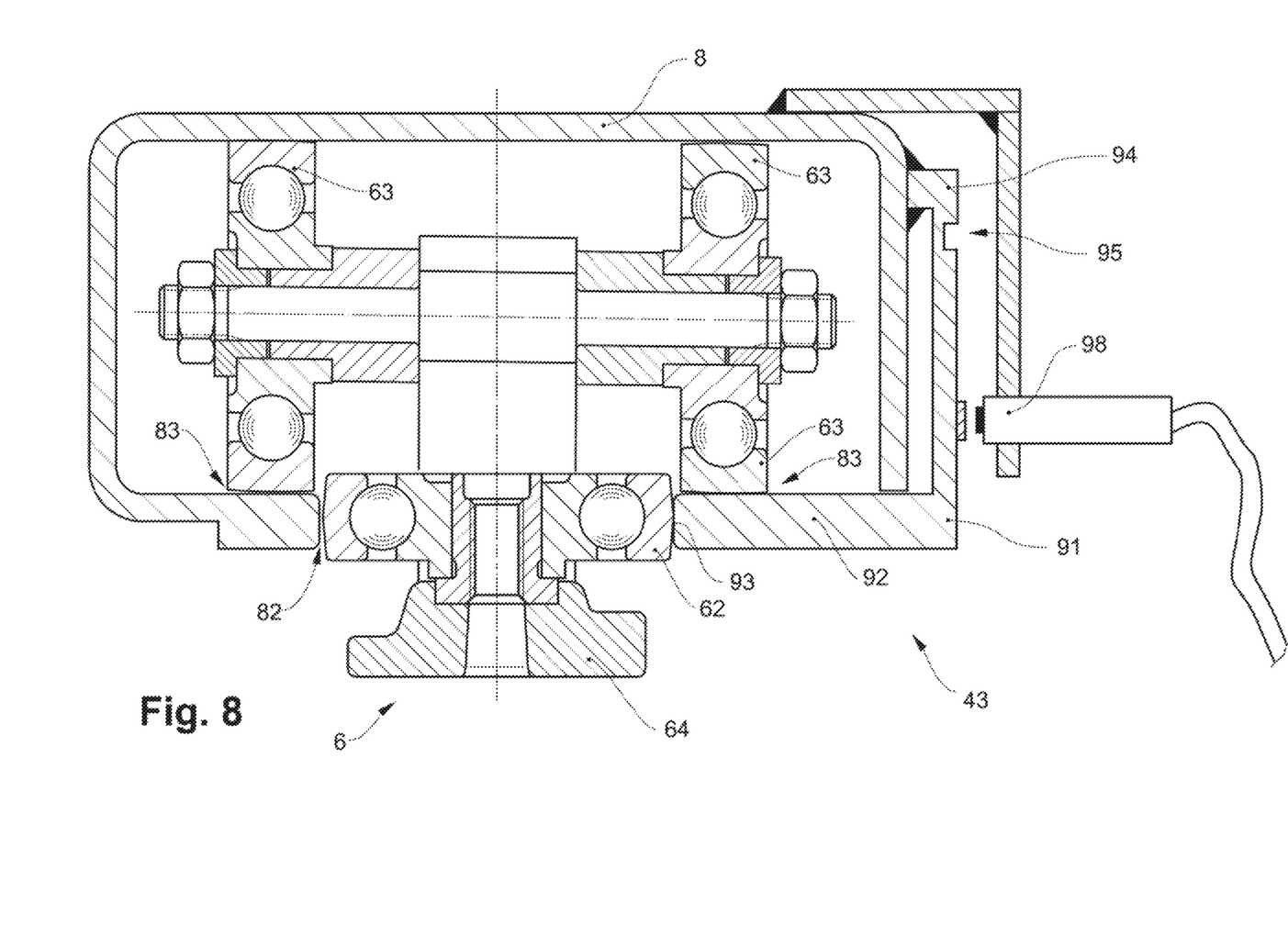

FIG. 2 shows a series of conveying links 6 of a conveying member 7. The conveying links 6 are connected to one another by way of chain connection elements 61, for example ball joints. Pulling forces and/or pushing forces can be transmitted between the conveying links 6 by way of the chain connection element 61. Cross sections of conveying links 6 and their interaction with a conveying track 8 are shown in FIGS. 6 to 8. A conveying link 6 each includes a guide roller 62 or guide wheel and as a rule two run rollers 63 or run wheels as well as a connection element 64 for connection to a conveying element (not shown). The guide rollers 62 are led between the guiding regions 82 of the conveying track 8 and can roll on surfaces or guide surfaces of these guiding regions 82. The run rollers 63 roll along on the roll regions 83 of the conveying rack 8. As a rule, but not necessarily at all locations of the conveying track 8, the conveying track 8 runs in a manner such that the gravitational force presses the run rollers 63 against the roll regions 83. As a rule, the rotation axes of the run rollers 63 run orthogonally to the rotation axes of the guide rollers 62. A conveying element can be for example a plate of a plate conveyor, a gripper, a conveying tray etc.

Figure 3:
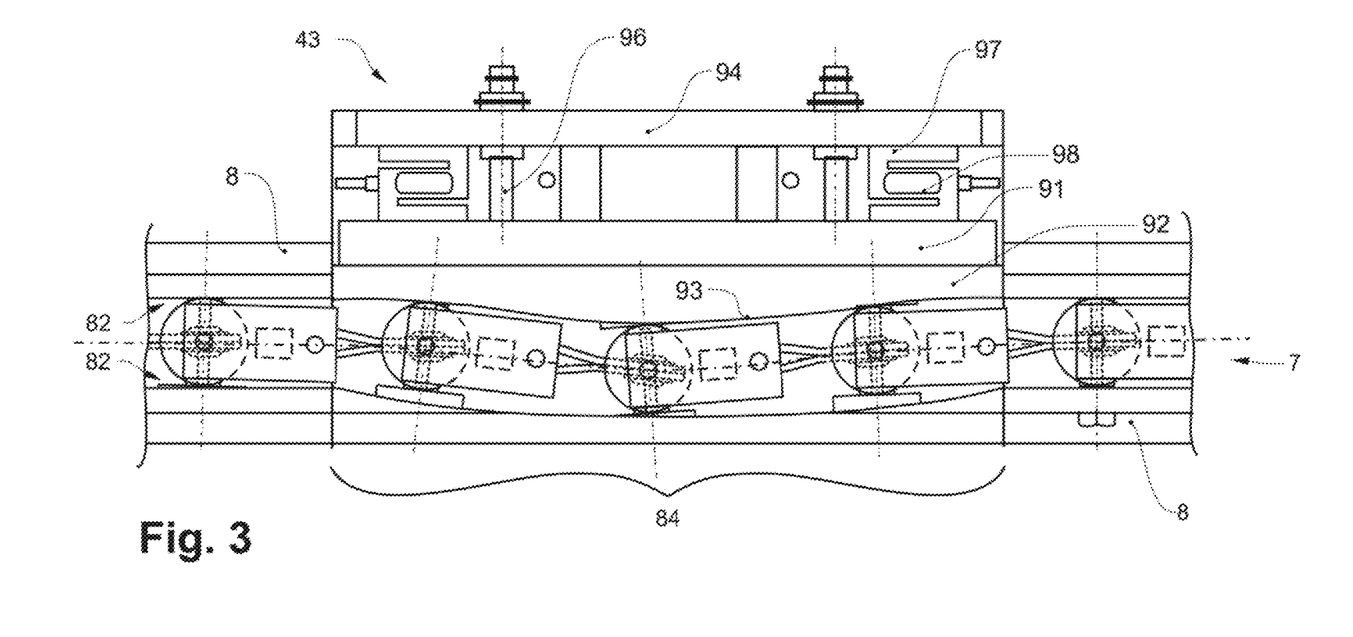
FIG. 3 a measuring device in a measuring section of a conveying track.

FIG. 3 shows a measuring section 84 in a conveying track 8 or circulating track of the conveying member 7. A measuring device 43 is arranged in the measuring section 84 and forms a part of the conveying track 8. The measuring device 43 includes a measuring element 91. A part of the measuring element 91 faces the conveying member 7 and forms a deflecting element 92. The deflecting element 92 deflects the conveying members 6 with regard to a straight-lined connection through the measuring section 84. In other words, the deflecting element 92 deflects the conveying member 7 with respect to a straight line between the beginning and the end of the measuring section 84. The guide rollers 62 roll on a deflecting surface of the deflecting element 92. This deflecting surface forms a deflecting region 93 of the guide region 82. A force of the conveying links 6 against the measuring element 61, the force corresponding to a tensile force in the conveying member 7, results on account of this. The measuring element 91 is arranged for measuring this force. For this, it can be arranged in a movable manner with respect to a reference element 94, for example by way of a movable connection 95. The connection 95 can include one or more guides 96 and one or more spring elements 97 or elastic elements. These guides 96 and spring elements 97 can be separate components, as in the example of FIG. 3. Or they can be realised together in one or more components, as in the example of FIG. 6 or 8. One or more measuring transducers 98 are provided for measuring the movement of the measuring element 91 relative to the reference element 94. In the embodiment of FIG. 3, the measuring transducer or transducers 98 can be strain gauges on spring elements 97. The reference element 94 is assembled in a rigid manner with respect to the conveying track 8.

Figure 4:
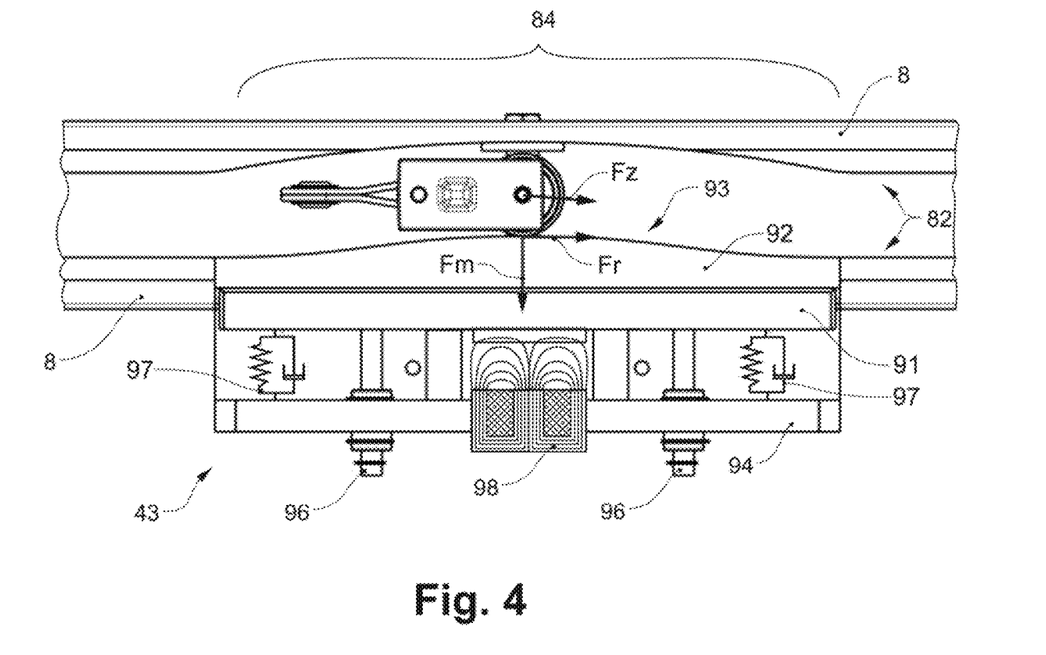
FIG. 4 forces which act upon a conveying link and details of a measuring device.

FIG. 4 basically shows the same elements as the previous figure, with the difference that
- only a single conveying member 6 is drawn, together with forces which engage thereon: tensile force Fz, measured normal force Fm and rolling friction force Fr; and
- the spring elements 97 are represented schematically by way of the combination of an ideal spring and a damping; and
- the measuring transducer 98 realises a contact-free measurement of a relative position of the measuring element 91 and reference element 94, for example with an inductive sensor.

Figure 5:
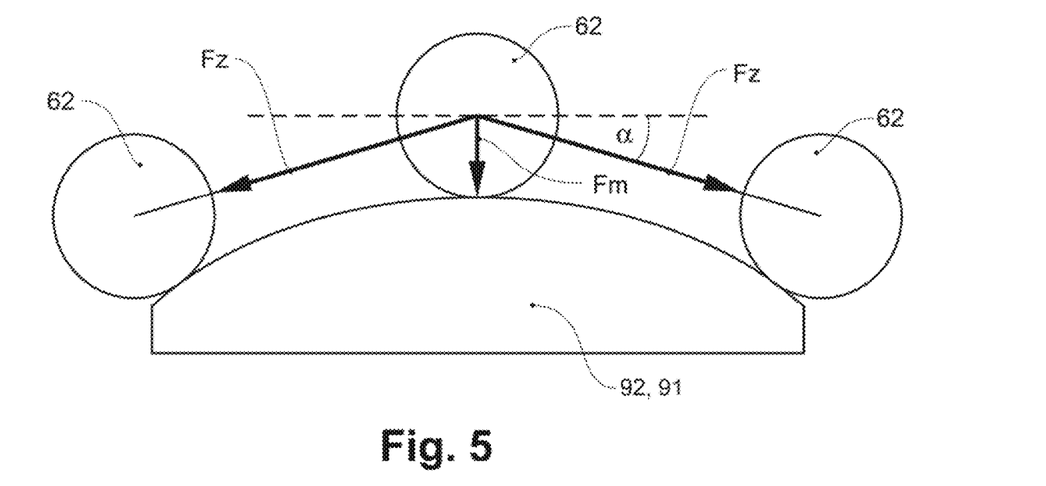
FIG. 5 forces which occur on a conveying link.

FIG. 5 schematically shows the geometric situation and occurring forces when the guide rollers 62 roll along the deflecting element 92. The conveying member 7 is angularly bent by way of the deflection of the guide rollers 62. In the shown position, a guide roller 62 bears centrally on the deflecting element 92. An angle of 180°-2α lies between two consecutive conveying links 6. A tensile force Fz which acts upon the conveying member 6 is directed at an angle α to a tangent to the deflecting element 92 in the point of contact of the guide roller 62. The tensile force on the conveying link 6 corresponds to a tension, to which the conveying member 7 is subjected. The tensile force is approximately equal to the tension for a small angle α. The measured normal force Fm, which acts from the guide roller 62 onto the measuring element 91, is FM=Fz*2*sin(α).

The measured normal force varies periodically in accordance with the position of the conveying links 6 or their rollers along the measuring element 91 in the longitudinal direction. This is the case independently of whether one, two, three, four or more of the rollers simultaneously roll on the measuring element 91 and thus contribute to the measured normal force.

In embodiments, independently of this number of rollers, the measurement value, from which the tensile force or tension is determined, can be determined by way of filtering, in particular by way of a temporal averaging of the measured normal force.

The determining of the tensile force or tension can be determined by way of a stored function or characteristic curve from this measurement value. The characteristic curve, which is herein used, can be determined specifically for a given combination of conveying member 7 and measuring device 43. The characteristic curve can be dependent on how many conveying links 6 or their rollers maximally or as a temporal average roll on the measuring element 91 in each case.

FIGS. 6 to 8 show various embodiments of measuring devices 43 in cross section. Individual elements of these have already been described above. The connection 95 is realised here by a single element, which unifies the function of the guide 96 and of the spring element 97. Here, this is a necking between the reference element 94 and the measuring element 91. Herein, the reference element 94 and measuring element 91 can be designed as sections of a single-part component. In particular, this can be a section of a profile element, for example of an L-shaped profile element. This includes two arms. An outer end of a first arm forms the measuring element 91 and the deflecting element 92 with the deflecting region 93, the deflecting element being designed for the rolling of the guide rollers 62. An outer end of the second arm is fastened to the conveying track 8. This fastening can be movable, in particular elastic. And/or, as shown in the figures, the fastening can be rigid and the necking can run in the longitudinal direction of the profile element adjacently to the fastening. The necking forms the elastic connection 95 between the reference element 94 and the measuring element 91. The connection element 64—in the assembled and ready-to-operate state of the device—can lie on an upper side of the conveying member 6, as in FIG. 6. Or it can lie below, as in FIGS. 7 and 8. Herein, the (non-drawn) conveying elements also lie above and below the conveying links 6 and the conveying track 8 respectively. In the embodiments of FIGS. 6 and 7, the measuring transducer 98 is fastened to the measuring element 91, is co-moved with this and measures the position of the reference element 94 relative to the measuring element 91. The reference element 94 can be part of the conveying track 8. In the embodiments of FIG. 8, the measuring transducer 98 is fastened to the reference element 94 and measures the position of the moved measuring element 91 relative to the reference element 94.

Figure 9:
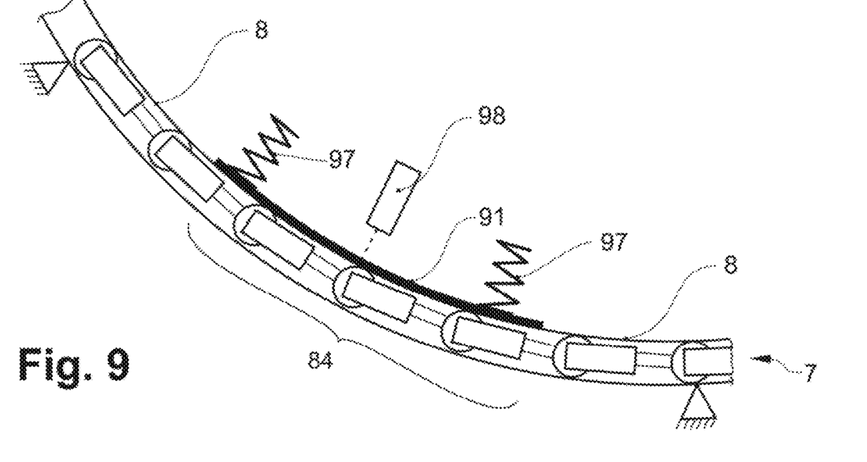
FIGS. 9 to 12 various arrangements of measuring devices and conveying tracks.

FIG. 9 schematically shows a measuring section 84 with a measuring device 43 in an arcuate section of the conveying track 8. The measuring principle is the same as in the previously shown straight sections of the conveying track 8: the conveying member 7 is deflected with respect to a straight line between the beginning and the end of the measuring section 84. Concerning this embodiment, a deflection of the conveying member additionally to the curvature does not take place, the curvature being necessary in any case due to the redirection in the arcuate section.

Figure 10:
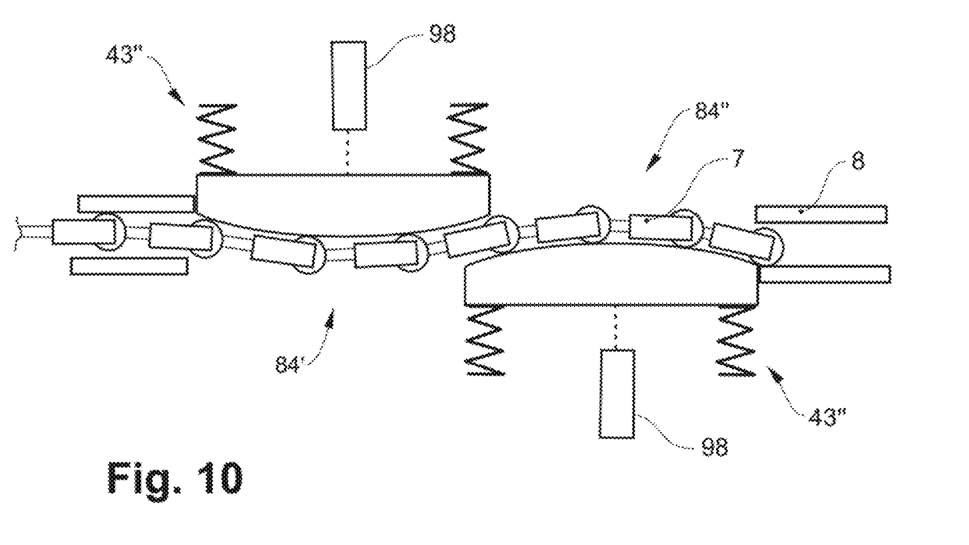

FIG. 10 schematically shows two measuring sections, a first measuring section 84' with a first measuring device 43' and a second measuring section 84" with a second measuring device 43". The two measuring sections 84', 84" overlap one another in the longitudinal direction or conveying direction of the conveying track 8. The two measuring devices 43', 43" act upon the conveying member 7 from opposite sides and deflect the conveying member 7 in opposite directions. Measurement values of the two measuring devices 43', 43" can be combined with one another, in particularly added, for determining the tension of the conveying member 7. With regard to this arrangement, the conveying member 7 only needs to be deflected half as far in both opposite directions compared to a deflection in only one direction, for a comparable measuring accuracy. Smaller force sensors can be used. The overlapping of the measuring sections can be matched to a distance between conveying links 6, so that measuring signals of the two measuring sections 84', 84" are phase-shifted, in particular by half a phase. If, for example, with regard to the first measuring device 43' a roller is deflected furthest by its deflecting element, then concerning the second measuring device 43" two rollers lie symmetrically to the point of furthest deflection of its deflecting element.

Figure 11:
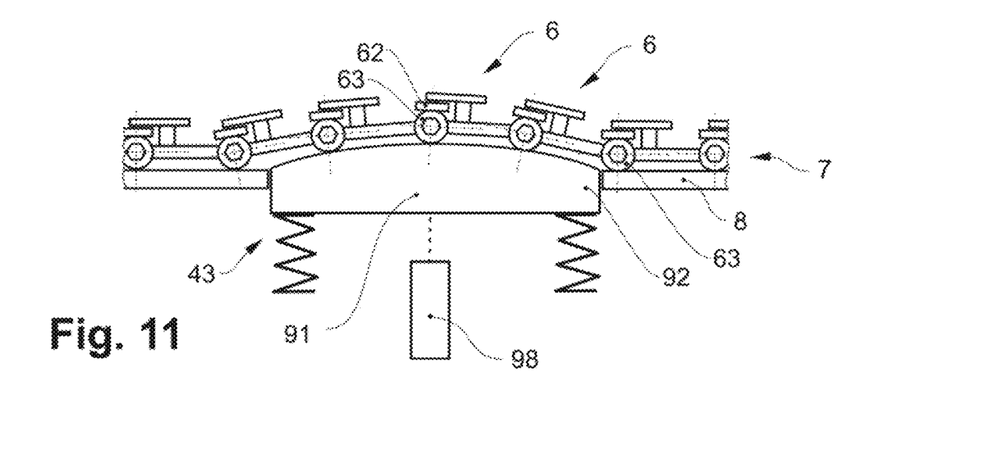
Figure 12:
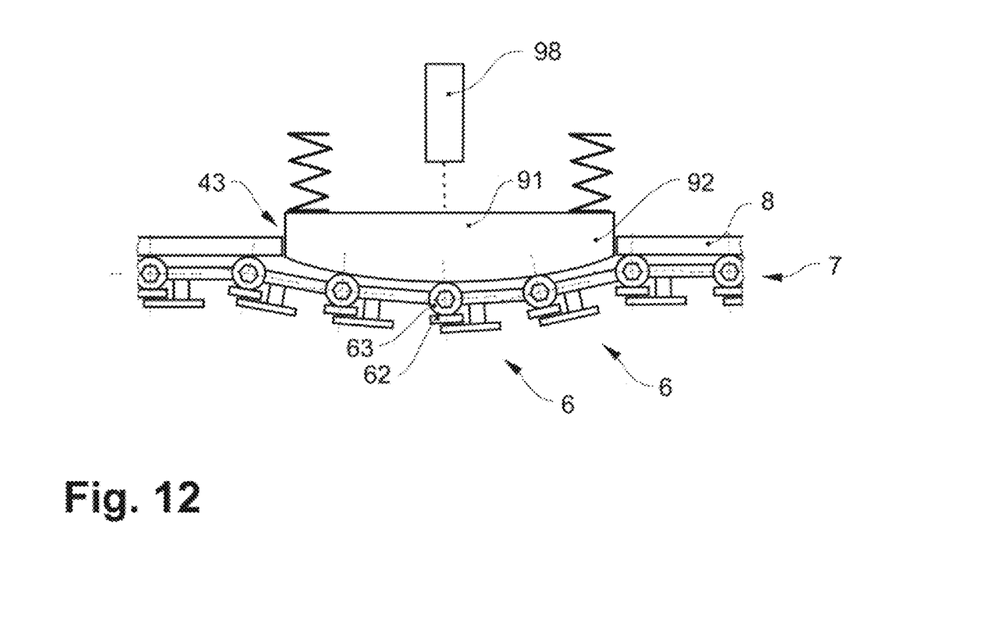

FIGS. 11 and 12 show measuring devices 43 that are arranged below or above the conveying member 7. The manner of functioning of the measuring device 43 is the same as in the preceding embodiments. Instead of guide rollers 62, it is however the run rollers 63 that roll on the deflecting surface of the deflecting element 92. This deflecting surface forms a deflecting region 93 of the roll region 83. A force of the conveying links 6 against the measuring element 91, corresponding to a tensile force in the conveying member 7 and a load component, results on account of this. On computing the tension, one is to take into account the fact that measurement values of the measured normal force $F_m$ also have a load component apart from a component, hereinafter called tensile force component, which is caused by the tensile force $F_z$. The load component corresponds to the weight of the conveying links 6, which bear on the deflecting element 92 or measuring element 91, and of the conveying elements, which are connected thereto and of the conveyed load. In the embodiment of FIG. 11, the normal force $F_m$ is equal to the sum of the load component and the tensile force component. In the embodiment of FIG. 12, the normal force $F_m$ is equal to the tensile force component minus the load component. Given a known load component, the tensile force component and therefore the tensile force can be determined from the measured normal force $F_m$.

In embodiments, a constant value can be used for the load component.

In further embodiments which are not represented, a first measuring device 43' can be arranged above and a second measuring device 43" below the conveying member 7, analogously to the embodiment of FIG. 10. The sum of the measured normal forces of the two measuring devices 43', 43" is equal to the sum of the tensile force components in the two measuring devices 43', 43" and is independent of the load component.

In all different embodiments, the measuring transducers 98 can be contact-free distance meters, in particular inductive or capacitive or magnetic distance meters. One or more measuring transducers 98 can be present.

A measurement compensation, which determines the measured distance from the sensor data on the basis of a characteristic curve that puts the distance and sensor data in a relationship to one another can be carried out in order to compensate non-linearities between the sensor data and the measured distance.

For example, the measuring device 43 is designed to measure normal forces up to 1600 N. For example, the measuring device 43 is designed to withstand tensile forces of over 2500 N without any damage. Herein, the measuring element 91 can be situated in a mechanical end-stop with regard to the reference element 94.

The measuring range for the tension can be for example 2000 N. A corresponding normal force can be 200 N. A corresponding deflection of the measuring elements 91 with respect to the reference element 94 can be 50 micrometres.

A length of the measuring section 84 is for example between 300 and 500 or 1000 millimetres.

A region, in which the deflection of the conveying members 6 takes place, lies for example between 50% to 80% or 100% of the length of the measuring section.

The deflection of the conveying members by the measuring element 91 is for example between 2 and 40 millimetres, in particular between 3 and 30 millimetres, in particular between 5 and 20 millimetres.

The angle α is between for example 1 to 10 degrees, in particular 1.5 to 8 degrees, in particular 2 to 6 degrees.

A length of the conveying member 7 can be over one hundred metres, or over 500 metres, or over one kilometre.

The measured tensile force can be filtered before further processing for the closed-loop control, in particular by way of forming a temporal mean. This can compensate periodic reading fluctuations that result when the conveying members 6 roll along the measuring element 91.

The invention claimed is:

1. A measuring device for acquiring measurement values for measuring a tension in a conveying system,
   wherein the measuring device is designed to
   guide a conveying member with rollers from a first section of the measuring device to a second section of the measuring device,
   to effect a deflection of the conveying member with regard to a straight-lined connection between the first and the second section and
   to detect measurement values corresponding to a reaction force according to this deflection,
   wherein the measuring device comprises a guide channel with surfaces for guiding the rollers of the conveying member in at least one of a horizontal direction or a vertical direction, and wherein one of these surfaces is a deflecting surface for deflecting the conveying member, and the deflecting surface is formed on a deflecting element of a measuring element and the reaction force is a force that acts upon the measuring element.

2. The measuring device according to claim 1, wherein the measuring device is designed for the positive guidance of the conveying member.

3. The measuring device according to claim 1, wherein the measuring device comprises one or more measuring transducers for determining the measurement values, and the one or more measuring transducers are arranged for the contact-free measurement of a position of the measuring element with respect to a reference element.

4. A conveying unit, comprising a conveying track and a conveying member with rollers that is guided therein and further comprising at least one measuring device according to claim 1 for measuring a tension in the conveying member.

5. The conveying unit according to claim 4, wherein the conveying member comprises conveying links that are concatenated to one another, and a conveying link comprises rollers for the support and for the guidance of the conveying links in the conveying track.

6. The conveying unit according to claim 5, wherein rollers which roll on the deflecting element of the measuring element are guide rollers that effect a lateral guidance of the conveying links in a conveying track.

7. The conveying unit according to claim 5, wherein the rollers that roll on the deflecting element of the measuring element are run rollers that effect a supporting guidance of the conveying links in a conveying track.

8. The conveying unit according to claim 4, wherein the measuring device is designed such that at least two conveying links bear with their rollers on the measuring element at every point in time on operation of the measuring device.

9. The conveying unit according to claim 4, wherein the conveying links in each case are elements of a plate conveyor or of a gripper conveyor or of a tray conveyor or of a modular belt conveyor or of a pocket conveyor or of a suspended conveyor.

10. A conveying facility comprising at least one conveying unit with a conveying member, with at least one measuring device according to claim 1, for measuring a tension in the conveying member, with at least one drive and with a controller that is designed to closed-loop control the at least one drive in accordance with measurement values of the at least one measuring device.

* * * * *